(12) United States Patent
Buer

(10) Patent No.: US 7,987,356 B2
(45) Date of Patent: Jul. 26, 2011

(54) PROGRAMMABLE SECURITY PLATFORM

(75) Inventor: Mark L. Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1323 days.

(21) Appl. No.: 11/290,325

(22) Filed: Nov. 29, 2005

(65) Prior Publication Data

US 2006/0117177 A1 Jun. 1, 2006

Related U.S. Application Data

(60) Provisional application No. 60/631,393, filed on Nov. 29, 2004.

(51) Int. Cl.
*H04L 29/06* (2006.01)
(52) U.S. Cl. ........................................ 713/155; 713/165
(58) Field of Classification Search .................. 713/155, 713/172, 189, 165; 380/200; 726/9
See application file for complete search history.

(56) References Cited

U.S. PATENT DOCUMENTS

| | | | | |
|---|---|---|---|---|
| 7,275,163 B2 * | 9/2007 | Cocchi et al. | ................. | 713/193 |
| 7,320,075 B2 * | 1/2008 | Sotoodeh et al. | ............. | 713/191 |
| 2003/0046563 A1 * | 3/2003 | Ma et al. | ....................... | 713/190 |

* cited by examiner

*Primary Examiner* — Michael Pyzocha
*Assistant Examiner* — Ali S Abyaneh
(74) *Attorney, Agent, or Firm* — Sterne, Kessler, Goldstein & Fox PLLC

(57) ABSTRACT

A dynamically programmable security device. The device includes: a secure nonvolatile read only memory (NVM-ROM) for securely storing a unique device cipher key; a secure interface for dynamically loading authenticated application code; a cryptographic engine for encrypting, decrypting data and authenticating the application code; a secure random access memory (RAM) for storing the authenticated application code and application data; and a processor for executing the authenticated application code.

24 Claims, 13 Drawing Sheets

PROGRAMMABLE SECURITY PLATFORM

CROSS-REFERENCE TO RELATED APPLICATION

This Patent Application claims the benefit of the filing date of U.S. Provisional Patent Application Ser. No. 60/631,393, filed on Nov. 29, 2004 and entitled "PROGRAMMABLE SECURITY PLATFORM," the entire content of which is hereby expressly incorporated by reference.

FIELD OF THE INVENTION

This application relates to secure data communication systems and, more specifically, to a programmable security platform for securing data transfers.

BACKGROUND OF THE INVENTION

The proliferation of distributed computing networks and, in particular, wireless communication networks has brought with it a greater need to secure the information that is transmitted through the networks. For example, the computing power and storage capacity now available in end-user devices such as cell phones and wireless PDAs makes them a convenience mechanism for storing and using sensitive information (e.g., personal and business contact and financial information). However, to store and use this information on an end-user device, a user may need to transmit the information to and from other locations (e.g., a server) via a relatively insecure network.

A variety of cryptographic techniques are known for securing transactions in data networks. For example, the SSL protocol (and its replacement TLS) provides a mechanism for securely sending data between a server and a client. Briefly, the SSL provides a protocol for authenticating the identity of the server and the client and for generating an asymmetric (private-public) key pair. The authentication process provides the client and the server with some level of assurance that they are communicating with the entity with which they intended to communicate. The key generation process securely provides the client and the server with unique cryptographic keys that enable each of them, but not others, to encrypt or decrypt data they send to each other via the network.

This process may be better understood by reference to FIG. 1 which depicts in simplified form several layers in a security system 102. Entities in the system may securely transfer data between one another by encrypting the data 104 before it is transmitted. Before another entity is able to decrypt received data, however, it should obtain an appropriate key. Hence, data encryption depends on a secure method of key negotiation 106 between the entities. If the key negotiation is not secure (e.g., the keys are intercepted by unauthorized persons), the encrypted data may be compromised. Likewise, a prerequisite to secure key negotiation is the ability to authenticate the parties 108 involved in the exchange. In other words, each entity should be sure that it is not negotiating with an entity that is, for example, masquerading as the intended entity. The authentication process ultimately relies on a root key 110 that uniquely and reliably identifies a specific entity. Hence, this root key is often referred to as the cryptographic identity of the entity.

In practice, a system may include many levels of cryptographic protection. For example, a typical e-commerce server may need to negotiate keys with thousands of clients per day. Moreover, these clients typically reside in relatively insecure environments (e.g., a personal computer). If the system is to remain secure, the root key should not be used for these transactions given that there is a relatively high possibility that the key may be compromised. Accordingly, in practice the root key is used to generate other keys that may then be used to generate even lower level keys.

Typically, these lower level keys will be used for relatively short periods of time. For example, lower level keys such as SSL session keys may be valid only for a single session. Thus, the potential for damage may be much less in the event a session key is compromised as opposed to a higher level key. For example, the entire system will not be compromised and the key will expire relatively quickly.

In contrast, once a higher level key is compromised, all subsequent (e.g., lower) levels may be compromised. Moreover, higher level keys tend to be used for relatively long periods of time. Thus, the potential for harm is much greater. Accordingly, protection of higher level keys is a primary goal in any cryptographic security system.

As mentioned above, in a typical e-commerce transaction a unique set of SSL keys are generated for each session. For example, when a user uses a web browser to securely access a financial website for a bank, a set of session keys may be generated for the session. These session keys are used to encrypt and decrypt data sent between the server (e.g., the bank's server) and the client (e.g., the browser). To prevent these keys from being intercepted by unauthorized persons, a higher level key (e.g., a private-public key pair negotiated between the bank's server and the client) will be used to encrypt and decrypt the session level keys. As discussed above, however, protection of this higher level key is of utmost importance.

Referring to FIG. 2, in a typical personal computer-based application, a client device stores its private key (Ka-priv) 214 in a system memory 206 of the computer 200. When a session is initiated, the server encrypts the session key (Ks) 228 using the client's public key (Ka-pub) then sends the encrypted session key (Ks) Ka-pub 222 to the client. As represented by lines 216 and 224, the client then retrieves its private key (Ka-priv) and the encrypted session key 222 from system memory via the PCI bus 208 and loads them into a public key accelerator 210 in an accelerator module or card 202. As represented by line 26, the public key accelerator uses this downloaded private key 220 to decrypt the session key and loads the clear text session key (Ks) 228 into system memory.

When the server needs to send sensitive data to the client during the session the server encrypts the data using the session key (Ks) and loads the encrypted data (data) Ks 204 into system memory. When a client application needs to access the plaintext (unencrypted) data, it may load the session key 228 and the encrypted data 204 into a symmetric algorithm engine (e.g., 3DES, AES, etc.) 212 as represented by lines 230 and 234, respectively. The symmetric algorithm engine uses the loaded session key 232 to decrypt the encrypted data and, as represented by line 236, loads plaintext data 238 into system memory. At this point the client application may use the data.

The SSL protocol and other protocols provide a relatively high level of security for data transfers when both the client and the server are secure. However, given the increased sophistication of hackers and authors of computer viruses, there is a possibility that the security of these devices may be comprised. For example, a virus running on a computer may be able to access data stored in the data memory of the computer. Moreover, the virus may be able to send this information to a third party.

Referring again to the example of FIG. 2, the client's private key (Ka-priv) may be stored in the clear (e.g., unencrypted) in system memory and it may be transmitted in the clear across the PCI bus. Moreover, operating system calls may be used to provide the data transfers to and from the cryptographic accelerator. All of these aspects of the system are susceptible to attack by hackers, viruses or other means. Given that in an SSL transaction the client's private key is essentially a certificate that identifies the server (hence it may essentially comprise the server's private key), conventional architectures such as this may not provide sufficient security for many applications.

Components such as a hardware security module ("HSM") may be used to provide a higher level of security for highly security-sensitive applications. Conventionally, a hardware security module provides secure key management to generate cryptographic keys, sets the capabilities and security limits of keys, implements key backup and recovery, prepares keys for storage and performs key revocation and destruction. These modules are typically constructed as multi-chip boards potted with an epoxy material to provide very strong security. However, due to the use of the epoxy material and the functional key management requirements, a hardware security module is typically a very expensive device that has a large system footprint and has limited capabilities outside of key management. More importantly, these modules need to be re-designed and re-programmed (within a secured boundary) for different applications. For example, a SIMM Card for a mobile phone which only authenticates the user needs to be replaced by another hardware module to perform credit card transactions over a wireless network.

Due to these constraints, it is impractical to implement a hardware security module into many types of end-user devices. Accordingly, a need exists for improved techniques for utilization of a low cost security module that is dynamically programmable within a secure boundary to support a variety of different secured applications.

SUMMARY OF THE INVENTION

In one embodiment, the invention is a dynamically programmable security device. The device includes: a secure nonvolatile read only memory (NVMROM) for securely storing a unique device cipher key; a secure interface for dynamically loading authenticated application code; a cryptographic engine for encrypting, decrypting data and authenticating the application code; a secure random access memory (RAM) for storing the authenticated application code and application data; and a processor for executing the authenticated application code.

In one embodiment, the invention is a method for securely executing a dynamically loaded application code in a security module. The method includes: storing at least one cipher key in a secure memory in the security module; authenticating the application code using the least one cipher key; dynamically loading the authenticated application code in the security module; switching the security module to an execution mode wherein, hardware configuration of the security module cannot be changed by the application code; securely executing the application code; and protecting the application data within a security boundary.

In one embodiment, the invention is a client security module device capable of performing different dynamically loaded security functions. The client security module device includes: a secure memory for storing a device identity key in a secure memory in the security module; a cryptographic engine for authenticating a first and second application codes for a first and second security functions using the least one cipher key; a secure interface for dynamically loading the authenticated first and second application code in a secure random access memory (RAM) in the client security module; a processor for executing the authenticated first application code within a first security boundary and executing the authenticated second application code within a second security boundary, wherein the secure interface dynamically loads the authenticated second application code while the first application code is being executed by the processor.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

Figure 1:
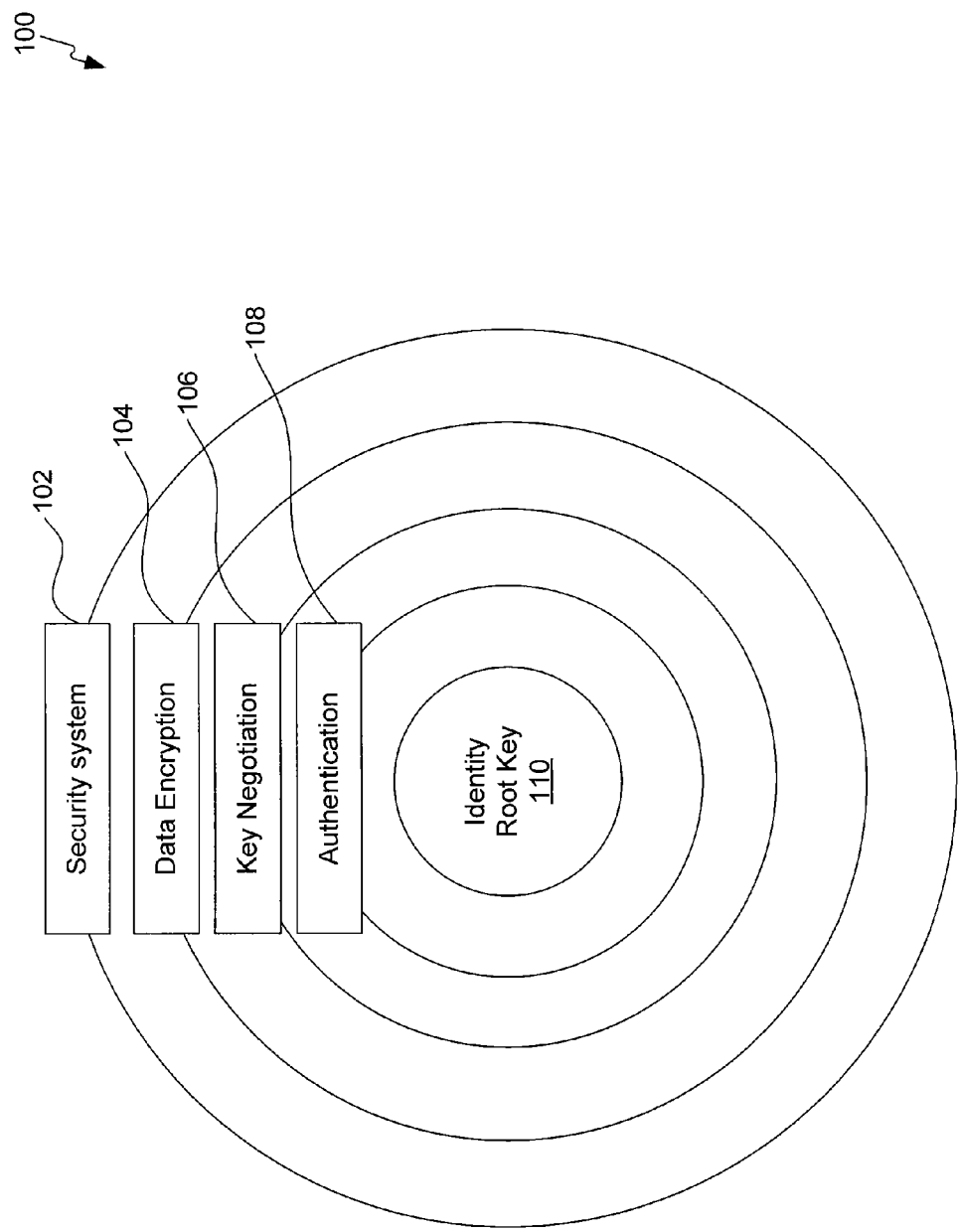
FIG. 1 is a simplified diagram of exemplary layers in a security system.

In one embodiment, the invention is a client security module (CSM) hardware device that is capable of performing different security functions and protocols by dynamically and securely loading different firmware into the device.

In one embodiment, the CSM is an embedded silicon hardware module that provides a secure environment in an embedded system on a chip (SoC) design for security processing. The CSM is capable of securely loading code for execution of trusted processes within a secure environment on a client device, for example, a mobile phone, a set-top box (STB), a PC, and the like. The security services for the executable code are provided within the secure boundary of the CSM. The Embedded CSM can be used for a variety of secure applications. For example, the CSM embedded into a cable STB could be used to execute a conditional access system within the STB. The conditional access system can be updated and changed by downloading new software to the CSM. The executing code is only known to the CSM (that is, encrypted and authenticated) and protected by the security boundary of the CSM. Key management applications can run on the CSM with any sort of dynamic, public, asymmetric, symmetric, revocable key policies without exposing the details (or code) that is used to implement the key management application. CSM allows a user to provide trusted code for conditional access applications. It also provides secure session key generation and protection.

In the example of the STB, the security of the system is enhanced since the key material for the STB is handled internal to the STB SoC. Current systems require that the key be transferred from the conditional access security device to the STB SoC (typically in a manner much less secure than the conditional access system). The CSM can also be used to execute existing security standard applications such as the OpenCable host communication with the external security POD for the cable STB SoC device. The CSM can also be used to implement security services such as OpenCable Applications Platform (OCAP) interfaces as a secure application and Trusted Platform Module (TPM) services. TPM standard set by the Trusted Computing Group (TCG) strives to achieve trusted computing.

In one embodiment, the CSM can be used with existing security systems (that is, backward compatible) and provide the capability to upgrade the systems. The CSM can be deployed in an evolutionary manner that allows existing systems to retain the current security solution while allowing for the possibility of upgrading to a new security solution after deployment. The flexibility of the standards based architecture of the CSM combined with the single chip implementation, provides a low cost security solution that can be used in a variety of user applications.

In one embodiment, the CSM provides a mechanism to securely store application keys in the local host outside the CSM. The application key data is encrypted using the long term device public key for local storage. The key data can only be recovered by this unique CSM and should be signed by an authorized application server.

Moreover, the characteristics of the CSM can be changed dynamically. For example, the functionality of the CSM can change from a TPM to a financial transaction application. Thus, if the CSM is embedded into, for example, a cell phone, the CSM can be used as a SIMM Card and then by (securely) reloading a different firmware, it could be used as a credit card application. This way, different users could have their own application that would load into the CSM. At the same time, the CSM can be used to implement services of a TPM, as well.

Figure 3:
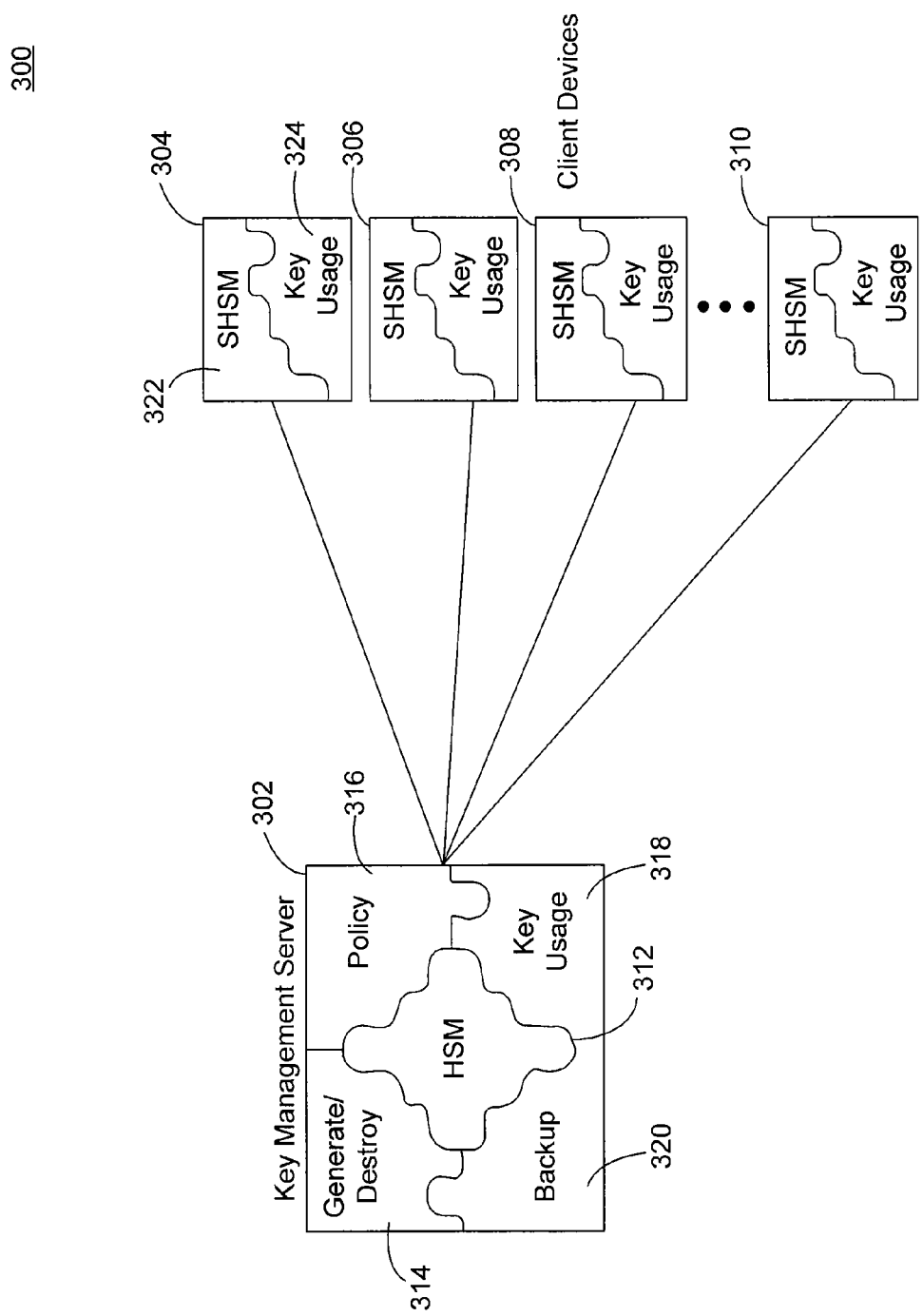
FIG. 3 is a simplified diagram of an exemplary security key management system in a client/server configuration.

FIG. 3 illustrates one embodiment of a key management system 300 that incorporates stateless key management modules (hereafter referred to as stateless modules for convenience). Here, a key manager (e.g., key management server 302) including a hardware security module (HSM) 312 is configured to manage multiple remote stateless modules in client devices 304, 306, 308 and 310. For example, client device 304 includes a stateless hardware security module ("SHSM") 322.

The stateless modules provide key enforcement and/or usage functions that are, in effect, separated out from the main key management functions provided by a traditional HSM. For example, the HSM may provide services for secure key management such as generating and destroying keys 314, establishing and enforcing key policy 316, using keys 318, providing key backup and secure key storage 320 and communicating with peers.

Inherently, these operations require that the HSM keep track of its current state. For example, the HSM keeps track of all keys it generated and maintains state information associated with each of these keys. This information may be used, for example, to identify the entity to which each key was issued and determine when to destroy or revoke keys.

The client device 304 includes components for securely receiving keys (e.g., SHSM 322) and using keys (e.g., key usage component 324). Here, the stateless module does not generate keys or conduct peer-to-peer communication. Consequently, a stateless module typically receives the keys needed by its client device from a key manager.

A stateless module does not need to maintain state information to receive keys and use keys. When a stateless module boots up, the only key information it has is an identity key that is stored in nonvolatile memory. However, this key information is stateless because it does not change.

To perform its designated tasks, the stateless module may be configured to establish a secure connection with an HSM using its identity key. For example, these components may cooperate to define complementary keys that are used to encrypt data sent from one component to another and decrypt any encrypted data that was received from the other component. This secure connection enables the stateless module to securely perform the basic operations of receiving and using keys and/or data. These operations do not, however, require that the stateless module maintain the state of these keys. Rather, the stateless module merely needs to use the keys within a security boundary and enforce any policy received with the key.

Conventional key usage operations may include one or more of encryption, decryption, authentication, signing and verification. For convenience these terms may simply be referred to herein as cryptographic processing. As an example, after the HSM securely sends keys to the stateless module these keys may be used to decrypt data and/or keys for a client device. In addition, the stateless module may send secured (e.g., encrypted and/or authenticated) data to a designated device via the secure connection.

The stateless module provides a secure usage environment that may be remotely separated from, yet cryptographically secured to, the HSM. First, any keys and data within the stateless module may be protected by hardware (e.g., the physical constraints provided by the integrated circuit, i.e., chip). Second, the stateless module may be configured to prevent the keys and data from being exported from the chip in the clear. Third, as illustrated in FIG. 4 a key transfer protocol may be established between an HSM 402 located in a key management server and a stateless module 410 located in a remote system 406 to, for example, allow keys generated in the HSM to be securely transferred to the remote system.

As discussed above an encrypted link (e.g., secure connection) 404 may be used to effectively extend a security boundary 408 of the HSM to include the stateless module. The encrypted link allows for key material to be transferred over an insecure communication channel (e.g., a dedicated link or a link through a network such as the Internet) between the HSM and the stateless module.

Figure 4:
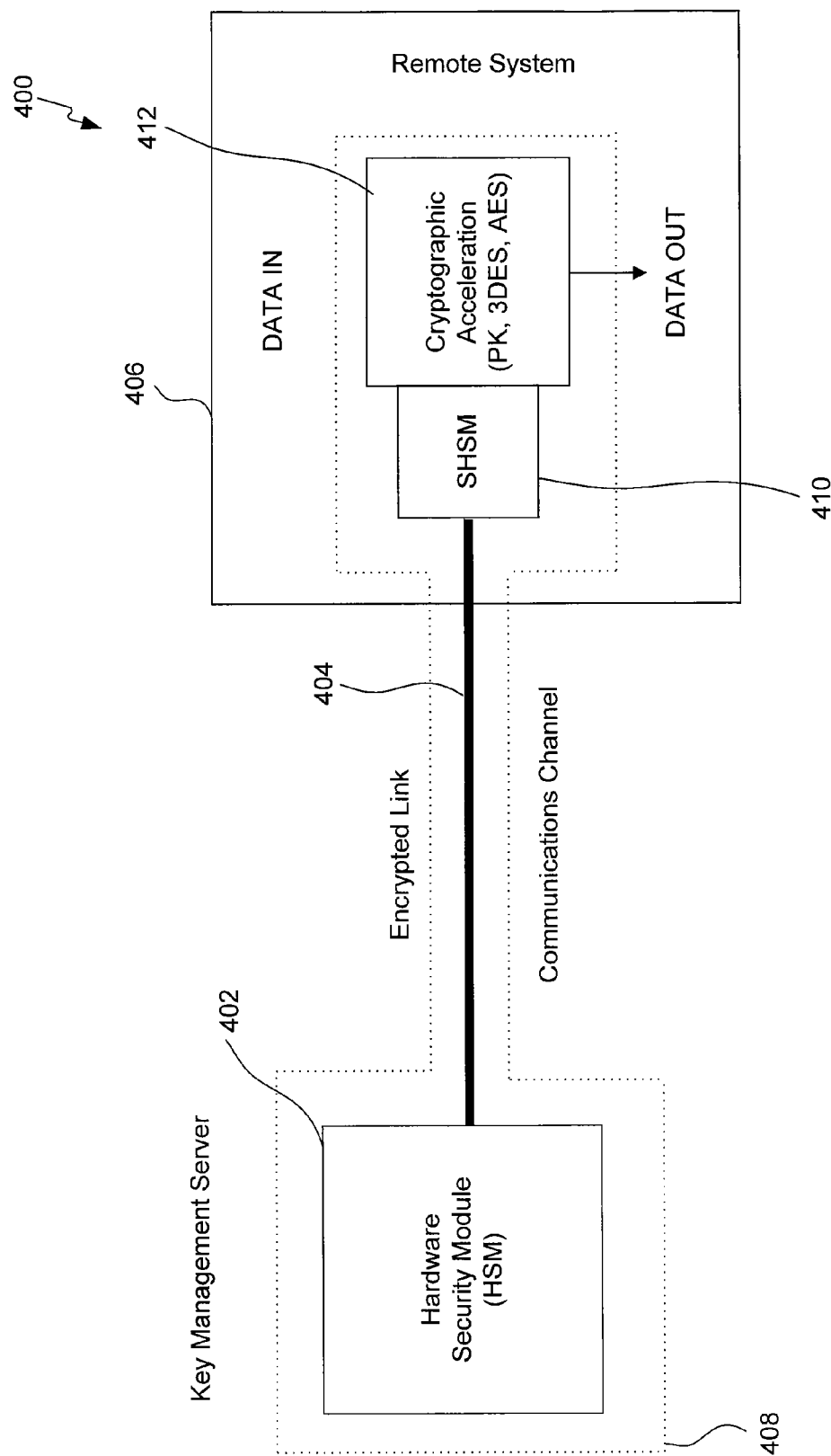
FIG. 4 is a simplified diagram of an exemplary security system constructed in accordance with the invention.

FIG. 4 also illustrates that the stateless module may receive encrypted key material from the HSM for use with a local cryptographic accelerator 412. The cryptographic accelerator also may be implemented within the effective security boundary 408. For example, the cryptographic accelerator and the stateless module may be implemented on the same integrated circuit. Alternatively, keys and data transferred between these components may be encrypted.

Thus, cleartext and ciphertext may be sent to the cryptographic accelerator without exposing the key material outside of the security boundary. As a result, any key material that is decrypted locally by the stateless module may never be exposed outside the security boundary.

Typically the stateless module would be embedded inside a client device that uses cryptographic services. For example, the stateless module may be implemented in end-user devices such as cell phones, laptops, etc., that need some form of data security. Typically, the stateless module would be integrated into previously existing chips (e.g., a main processor) within these devices.

In this way, the stateless module may provide cost effective remote key management for a client device. The stateless module may provide and/or support any required cryptographic processing. A security boundary is established within the device to securely maintain and use keys and key material. Yet the system may be managed by the HSM key management system (through the stateless module). Accordingly, the desired security functionality may be provided using a relatively small stateless module. Moreover, this functionality may be provided with minimal impact on the rest of the device.

Figure 5:
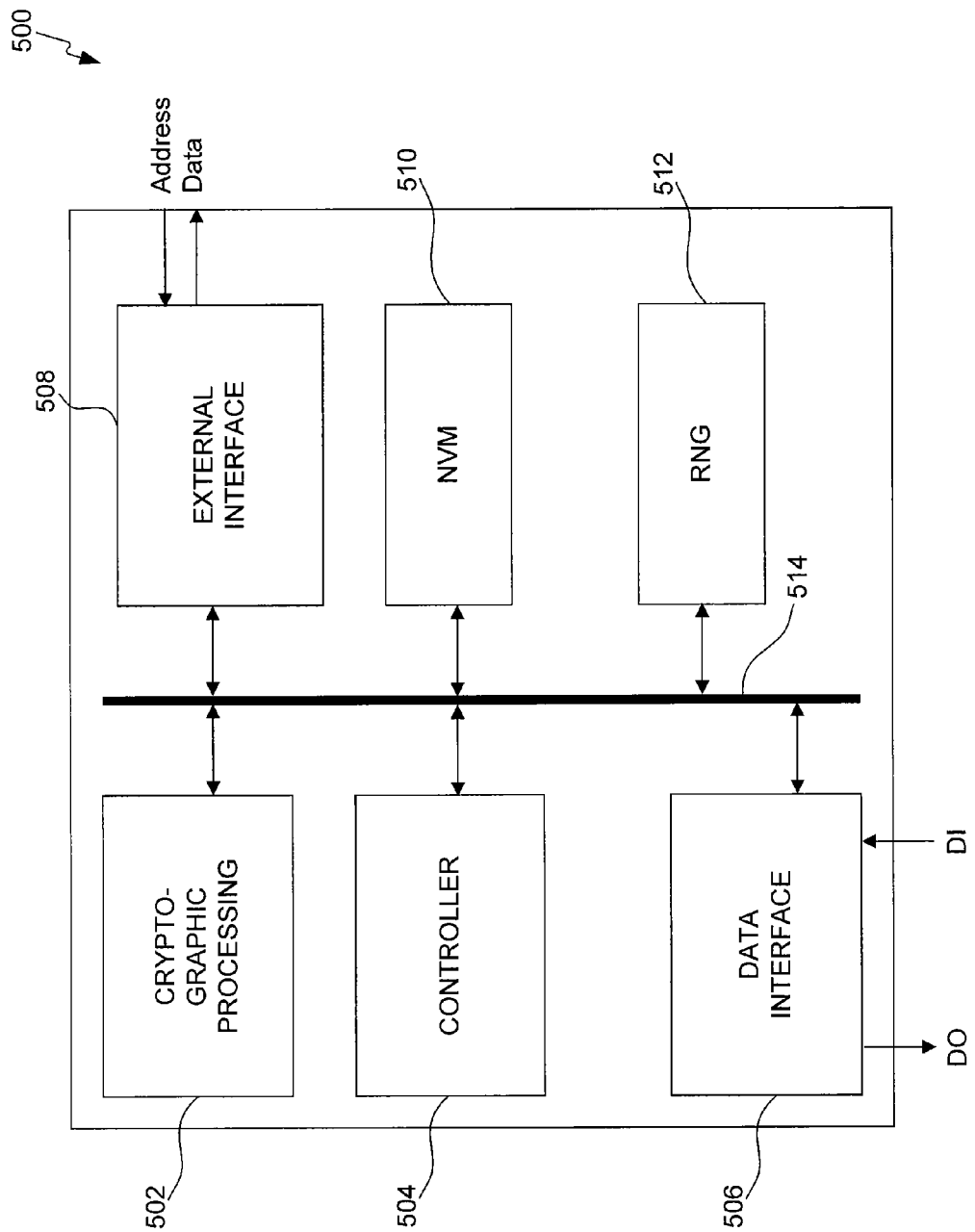
FIG. 5 is a simplified block diagram of an exemplary stateless hardware security module.

To support this key management scheme, a stateless module provides mechanisms for securely loading one or more keys into the module, securely storing the keys and securely using the keys. One embodiment of a stateless module 500 that provides such mechanisms is depicted in FIG. 5.

The stateless module 500 includes a controller 504 for controlling the overall operation of the module. For example, the controller may control boot operations, key management operations (if applicable) and data and key traffic flow into and out of the module. The controller may comprise, for example, a processor and associated code (not shown) and/or a state machine or other hardware. The controller and/or any other component in the stateless module may communicate with other components in the stateless module via an internal bus 514.

A bi-directional external interface 508 provides a mechanism to send keys and/or data to or receive keys and/or data from the module. For example, the external interface may include registers that may be written to or read by the controller and external devices that are connected to the stateless module. In this case, the controller may be configured so that it never writes certain data (e.g., unencrypted keys) to the registers.

The root, identity key for the module is typically stored in an on-chip nonvolatile data memory ("NVM") 510. For example, the NVM may comprise a one-time programmable memory. In this case, an unalterable identity key may be protected within the device.

In some embodiments, one or more keys (e.g., the root, identity key for the module) may be injected into the stateless module. This may be performed, for example, when the chip is manufactured, when the chip is tested, during manufacture at an OEM (e.g., circuit board manufacturer), during OEM testing or during installation for the end user. This technique may be used to inject symmetric and/or asymmetric keys.

In some embodiments, the stateless module may generate one or more keys internally. For example, the stateless module may include a random number generator ("RNG") 512 and other circuitry necessary to generate a key. This embodiment may provide added security in that the generated key may never leave the security boundary of the chip.

Typically this embodiment is used to generate an asymmetric key. Here, the private portion of the asymmetric key may be maintained within the security boundary of the chip.

In addition, the stateless module also will include a mechanism for exporting the public version of the asymmetric key. For example, the public value may be loaded into the external interface register discussed above so that it may then be read by an external device.

A cryptographic processing block 502 performs any cryptographic processing that needs to be done to acquire or use keys or to cryptographically process data flowing though the module. In practice this processing block may comprise one or more processing blocks. For example, separate blocks may be used to perform asymmetric key algorithms (e.g., DSA, RSA Diffie-Hellman), key exchange protocols or symmetric key algorithms (e.g., 3DES, AES) or authentication algorithms (e.g., HAMS-SHA1). The cryptographic processing block may be implemented, for example, in hardware and/or using a processor that executes code stored in a data memory (e.g., ROM).

In some embodiments, data (e.g., key information) to be encrypted or decrypted may be provided to the stateless module 500 via a bi-directional data interface 506. For example the data interface may be connected to a cryptographic accelerator that uses keys decrypted by the stateless module. In addition, the data interface may be connected to an input device (e.g., a sensor) that generates data that needs to be encrypted by the stateless module.

Figure 2:
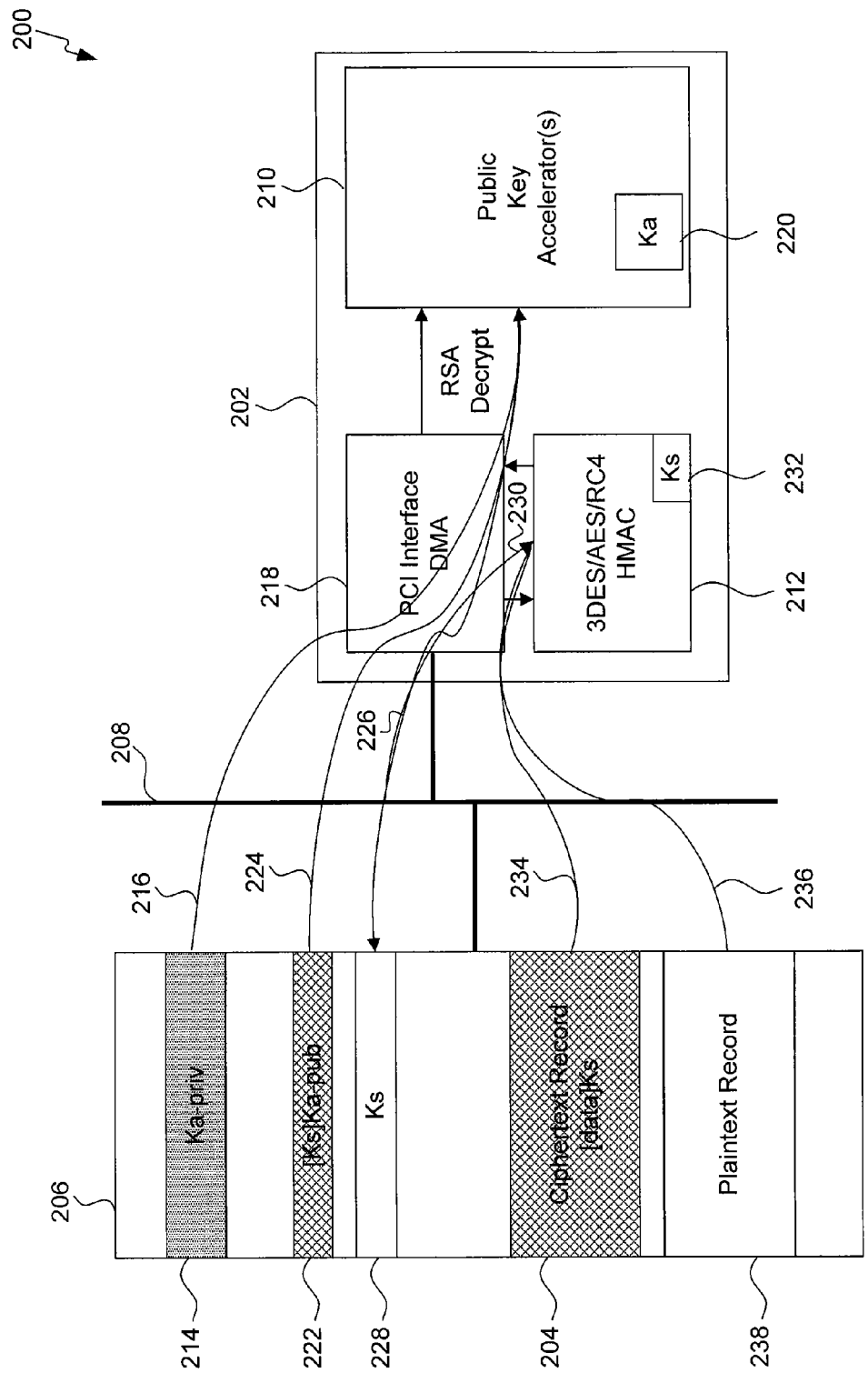
FIG. 2 is a simplified diagram of security processing in a computing system.
Figure 6:
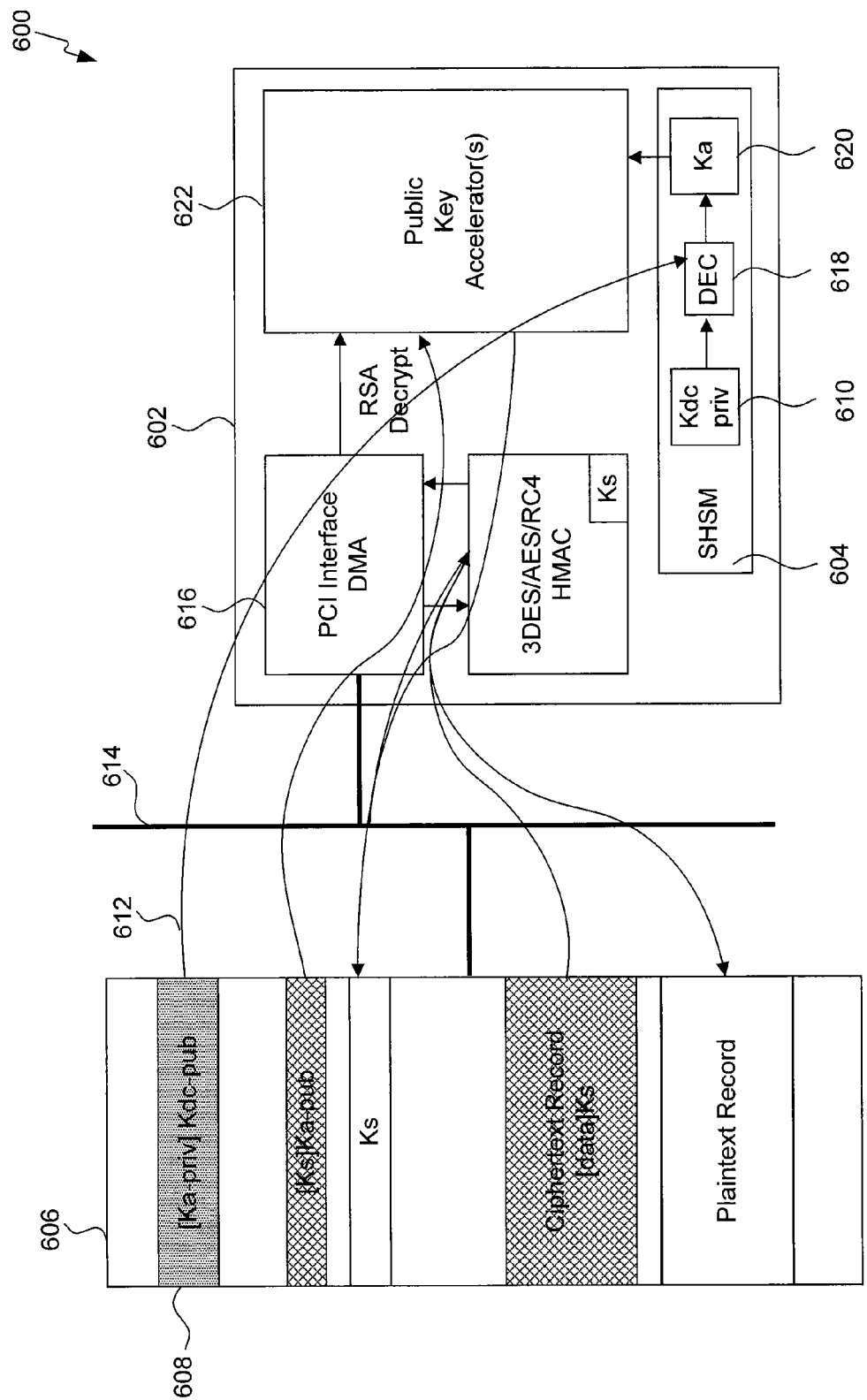
FIG. 6 is a simplified diagram of an exemplary security processing in a system constructed in accordance with the invention.

Referring now to FIG. 6, the secure usage environment will be discussed in more detail in the context of one embodiment of a PCI bus device 600 that incorporates a stateless module. In FIG. 6 the client's public key (KA-priv) is not stored in system memory 606 in the clear. Rather, the key manager (e.g., an HSM, not shown) that generates this key encrypts it with the public key (Kdc-pub) of a stateless module (e.g., SHSM 604). When encrypted session keys need to be decrypted the stateless module 604 retrieves the client's encrypted public key 608 from system memory via a PCI bus 614 and PCI bus interface 616 as represented by line 612. A decryption processor 618 in the stateless module uses the stateless module's private key (Kdc-priv) 610 to decrypt the encrypted public key. The stateless module then sends the decrypted public key (Ka) 620 to a public key accelerator 622. Since the accelerator may also be within the security boundary of the stateless module, the client's public key may never appear in the clear outside of the chip. The remaining operations of the system 600 may, for example, be performed as discussed above in conjunction with FIG. 2.

An example of a key negotiation protocol between a stateless module and a key manager (e.g., an HSM in a key manager) follows. When the stateless module is initialized for the first time after manufacture (e.g., during testing), circuitry in the module may use the random number generator to generate a public-private key pair. The module stores the private (identity) key in the nonvolatile memory. The stateless module then exports the public key and the manufacturer publishes this public key along with a certificate to a public server.

The certificate provides, from a trusted source such as the manufacturer of the module, verification to third parties that the public key may be trusted. For example, an entity that wishes to communicate with the stateless module may be assured by the certificate that the public key is authentic, that the public key is associated with a specific stateless module and that the stateless module protects its private key.

The stateless module may then be deployed, for example, in a computing device that is connected to another device (e.g., a key manager) via a network or some other link. When the stateless module is reset it uses its private key to negotiate a secure connection with the key manager. Here, the key manager uses the module's public key that it acquired from the public server. This secure connection may then be realized by each entity using the other entity's public key (or some other negotiated key or set of keys) to encrypt data to be sent to the other entity. The receiving entity may then decrypt the data using its private key (or negotiated key(s)).

Once this secure link protocol is established, the key manager may establish secure communications with the client that incorporates the stateless module. For example, the key manager may generate a private key (Ka-priv) for the client. As discussed above, the key manager may encrypt this key using the stateless module's public key (Kdc-pub) before sending it to the client. In a complementary manner, the stateless module may obtain and use the key manager's public key or some other key to sign or encrypt any data that needs to be sent to the key manager. There may be applications that do not require key management functions. Moreover, some applications (clients) may require more extensive key management functions beyond the capability of the stateless security module 500 of FIG. 5. For example, a client application such as, a financial transaction, may require including state information and certificate generation/validation according to the TPM standard. However, the current TPM services do not include bulk data encryption and do not have application key interface. Yet, other client applications may require a different security standard that may not be supported by the security modules of FIGS. 5 and 6.

Figure 7:
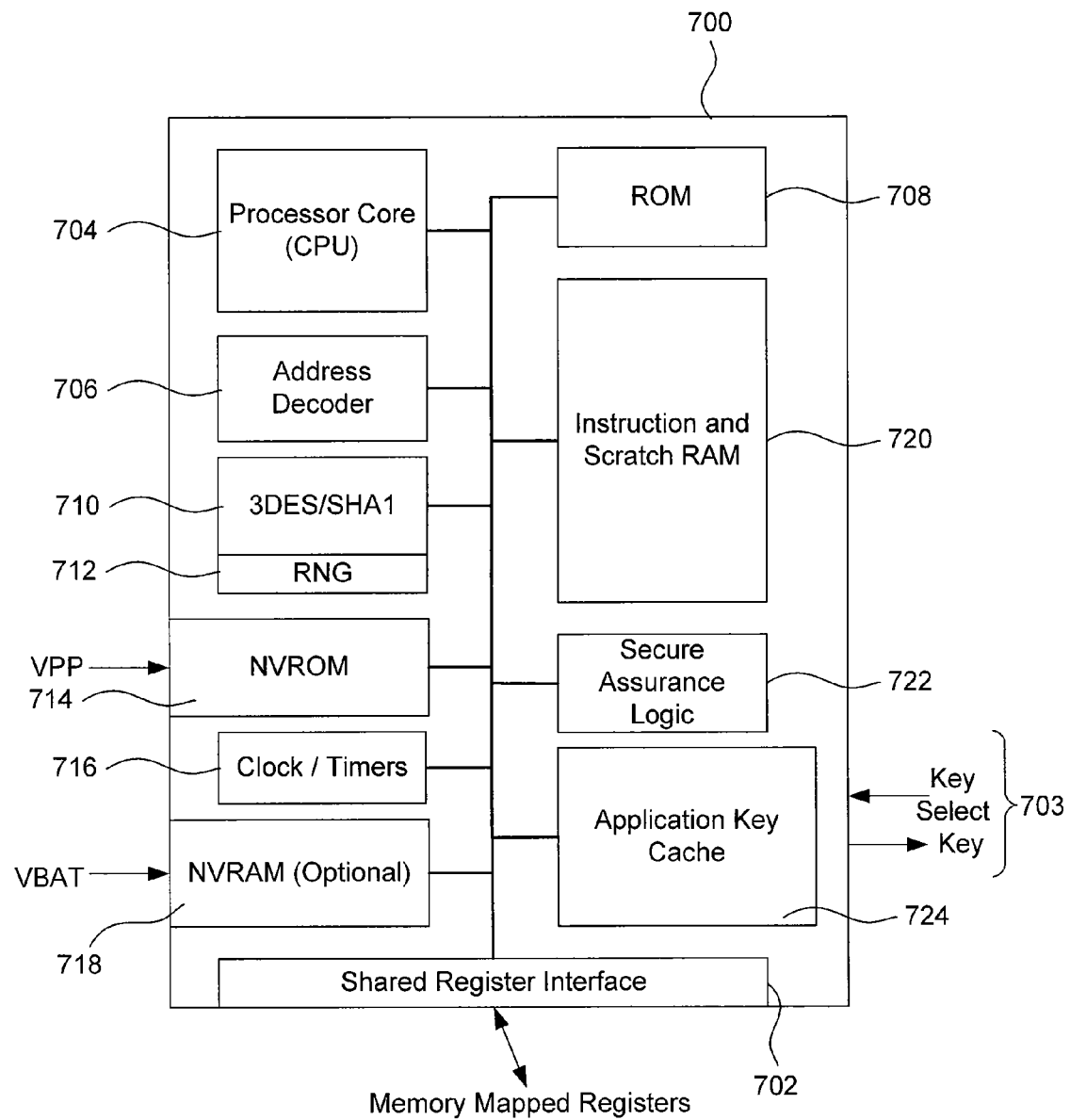
FIG. 7 is a client security module, according to one embodiment of the present invention.

An embodiment of a client security module (CSM), that includes a common hardware platform, but is capable of securely downloading firmware code for execution of trusted processes within a secure environment on a client device is shown in FIG. 7. In effect, the functionality of the CSM is defined by a user firmware. The firmware is securely and dynamically downloaded to the CSM to securely implement a variety of different security applications and protocols. In one embodiment, the CSM of the present invention is a generic key management client hardware component that can be embedded into different devices.

In one embodiment, the CSM provides a mechanism to authenticate the secure application code before allowing it to execute on the CSM. A SHA1 digest of the root authorization public key is programmed into the CSM NVROM during device initialization. Subsequent authorized public key values can be added by the root authorization authority. An authorized child can be given the capability to authorize child applications from the parent or it can be prohibited from authorizing further servers (end of chain). The CSM uses a chained signature scheme to build this structure. The root authorization code can be used to load a public key value that will be used to verify the signature of an authorized application server. The certificate parsing and searching is done outside the CSM since the values are public values.

In one embodiment, the CSM provides the capability to load secure encrypted and authenticated applications into the security boundary of the CSM. The secure application instructions and data are protected by the CSM security boundary. Therefore, the secure application provider can keep both the application code and the application data secret within the protected boundary of the CSM. The CSM provides secure services to the executing applications that prevent applications from accessing secure data within the CSM boundary. The secure applications can explicitly share data between applications only by placing the data outside the CSM boundary.

CSM 700 provides a number of functions that are required to allow a secure application to be loaded into the CSM for execution within the security boundary. The root key of the entire system is the device confidentiality key (KDC) that is stored inside a Non Volatile Read Only Memory (NVROM) 714. The KDC includes an asymmetric key pair (KDC-CS, KDC-CP) that is used to locally store the secure application code key (KSA) local to the CSM.

As shown in FIG. 7, CSM 700 uses two main interfaces for secure data communication. A shared register interface 702 is used to transfer data between an external system (un-trusted) and the CSM system (trusted). The application key cache interface 703 is used to provide key material to the cryptographic acceleration blocks within the external system. The key material is directly provided to the cryptographic acceleration blocks on the application key interface such that the cleartext key material is never exposed to the external system. There are no direct connections between the external system and the CSM. This ensures that the security properties of the CSM can be maintained via hardware monitoring.

A processor 704 executes code that implements a cryptographic application or system. The CSM contains the basic hardware building blocks that can be used by the application and the execution platform for the secure code. The CSM has been designed to ensure that implementations that do not require a battery can still provide all of the services required for a valid CSM.

In one embodiment, CSM 700 uses an Acorn RISC Machine (ARM) processor for the processor core 704. The ARM processor features a compact 16 bit instruction set, low power, integrated multiplier and small footprint making it a good choice for the CSM. The ARM processor is used to execute all of the code for the CSM system. The ARM processor is the only master processor of the CSM. The ARM processor boots to the internal ROM 708 after reset. A multiplier in the processor is used to accelerate a modular math library that is available in the Boot ROM for secure code designers to implement RSA, DSA, DH, ECC public key algorithms.

An address decoder 706 decodes the block select signals for the processor to access the internal system bus of the CSM. The address decoder re-maps the base address to RAM once executable code has been loaded to the instruction RAM 720.

The ROM block 708 can still be accessed for hardware access routines and the modular math libraries. The Boot ROM contains the required security processing primitives to initialize the CSM and load the secure code base.

In one embodiment, the Boot ROM includes the following functions:
Self-Test
Secure Code Loader
Generate Device Key
Report Device Public Key
Hardware Access Primitives (3DES, SHA-1, HMAC-SHA1)
Modular Math Library (RSA, DSA, DH, ModExp, etc.)
NVRAM Storage (sequence number management).

The CSM contains basic cryptographic acceleration blocks 710, such as DES/3DES Acceleration, SHA-1 Acceleration (capable of FIPS186-2 Random Number Generation Processing), Random Number Generator (RNG 712), and AES. These cryptographic acceleration blocks are used to implement the required cryptographic functions of the CSM. These acceleration blocks are also available for secure code applications. The 3DES/SHA-1 hardware acceleration blocks are provided to ensure that the loading time for secure applications can be accomplished in a reasonable amount of time.

Since most key management functions encrypt and decrypt key material, they operate on small amounts of data (typically 128 bits to 256 bytes). Therefore, any proprietary or new algorithms (such as AES) can be implemented to run on the processor core 704 for key management functions.

In one embodiment, the encryption core 710 is a triple DES minimal gate count implementation. It uses a single cycle per round implementation to minimize silicon size. The input is double buffered such that it can be loaded while operating on the previously loaded value. The output is implemented in the same manner such that the processor core can load the next and unload the previous values from the block while the current value is being processed. The single round implementation implements both encryption and decryption of the CBC and ECB 3DES algorithm.

The key is provided via a key register (write only) that is written by the processor core. A single key value can be loaded into the block at a time by the processor core. The key values are transferred from the application key cache, KEK key caches or the result of the shared secret derivation prior to data operations. The 3DES block protects the data operation such that the processor core cannot change the key during a block encryption or decryption.

In one embodiment, the authentication core (also shown as block 710) provides the basic SHA-1 algorithm implementation. The result of a given operation is a 160 bit digest. The initial value of the state registers for the SHA-1 algorithm can be programmed into the digest register as the starting point for the authentication. Since the processor core has access to the intermediate state (digest) values, the FIPS186-2 'x' value generation and FIPS186-2 'k' value generation are provided by this block in combination with the processor core.

A random number generator 712 is used to generate random numbers used for cryptographic functions. In one embodiment, the number generator 712 is a "true" random source. It utilizes free running oscillators to capture thermal noise as the source of randomness. The random number generator is controlled via configuration registers. It generates one bit at a time into a 64 bit capture register (shared register in the 3DES core) that is accessible by the processor core. Typically, the value from the random number generator is not used directly. Rather, it is post processed using the SHA-1 block by the processor core.

A non volatile read only memory (NVROM) 714 stores the device identity private key. In one embodiment, to keep the size of the NVROM to a minimum, CSM does not store the public key. Rather, CSM generates the public key pair from the private key stored in NVROM when required. The NVROM block 714 can be implemented as Battery Backed Random Access Memory (BBRAM), One-Time-Programmable memory (OTP), FLASH, EEPROM or other suitable memory technology. The memory technology chosen for NVROM should be secured against hardware attacks as specified by the security profile for the CSM.

A battery-less memory technology, such as an OTP, FLASH or EEPROM, is preferred for implementing the NVROM block. If the CSM NVROM block 714 is constructed with these technologies, the device can be both initialized and enrolled prior to installation into the system.

In one embodiment, a secure OTP block is used for storage of long term keys in the CSM. The processor core 704 ensures that the OTP array is completely clear by reading and writing the long term key cache locations prior to programming. If the array is clear, a single security bit is programmed first before programming any other bit elements.

The programming interface (VP) is used to address a single bit at a time by the processor core. A single bit address is written to the programming interface. Once the address has been selected, the processor core sets the program enable bit for the proper amount of programming time determined by a fixed program time and the pre-scaler for the time tick register. The VPP signal should be active for the entire device initialization command. The device long term keys are verified by reading the device key cache locations to ensure they are correct.

Once verified, the second security bit is programmed by the processor core to complete the initialization process. The NVROM will not mark the long term keys as valid unless both security bits have been programmed. The local hardware will lock out the programming logic unless both security bits are clear following a reset. This prevents a partially programmed bit array from being re-programmed. These methods ensure that the device keys, authorization and configuration data can be programmed once and only once (enforced by the local hardware). The security bits are read by hardware after the external reset is released and before the CSM is released from reset.

A clock/timer module 716 is used for time stamping purposes in a security implementation. The time stamp is typically used to prevent replay attacks between the head-end and the client device. In one embodiment, a simple time tick value is generated and is monitored for accuracy by the CSM while operating. The monitoring ensures that the clock could not be more than a certain margin faster or slower at any time. The time tick does not need to be a full real time clock. It only needs to be set to a reference that the security system understands. The CSM does not require that the clock timer is battery backed in the system. Once power is lost, the secure application resets the clock timer within the CSM. Since the time value is not secret, it can be broadcast at reasonably frequent intervals, or requested by the external system. Additionally interrupt timers are provided for timing out sessions, tracking time from connection to the head-end, etc. They can also be used to initiate interrupts to the processor core.

A security assurance logic 722 protects against system security attacks. Various system monitors are coupled with the basic design to ensure that hardware attacks can be resisted by the CSM. The protection circuits trigger a reset of the CSM. The reset wipes out all transient state information in the CSM including clearing all key cache locations. Preferably, the NVROM 714 is not cleared by the CSM reset. An interrupt is provided to the local host with information on which protection mechanism triggered the reset.

Additionally, a low frequency protection circuit ensures that the operating frequency of the CSM does not fall below a certain frequency. An operating point protection circuit is provided to ensure that all logic within the CSM operates as designed for all process, voltage and temperature conditions (or across all operating points). The protection circuit ensures that an attacker cannot change the operating point such that a timing path is violated in the CSM ensuring that the CSM always operates as designed. A watchdog timer block is used during processing. The timer is set in clocks by the processor core whenever a command (or sub-command such as a public key operation) is started based on the expected maximum command length. If the watchdog timer ever gets to zero a reset is issued to the CSM. The watchdog timer cannot be turned off and should be written periodically by the processor core to avoid clearing all of the CSM state.

The CSM also provides protection against multiple reset attacks using a reset monitor. The reset monitor uses a timer based on the time tick register increment that requires at least one tick before allowing more than 16 resets to occur. Additionally, an instruction jump protection is provided. That is, the processor core ROM is programmed using an extra bit to indicate which instructions are valid code entry and code exit points. The instruction code entry/exit points are enforced in hardware whenever the processor core takes a non-sequential code fetch. This mechanism ensures that it will be difficult for an attacker to get the processor core to bypass certain portions of code (i.e. random jumping is virtually impossible).

In one embodiment, the CSM includes a secure NVRAM 718. Alternatively or in addition to the secure NVRAM 718, the CSM includes the capability to use resources of the external system for secure NVRAM storage. The CSM uses the combination of a sequence number and a symmetric cover key are used to protect the data on a per application basis in the external NVRAM. The protection mechanism ensures that the data is encrypted, authenticated and protected from replay (via the sequence number). This NVRAM scheme is chosen in an effort to keep the cost of the CSM to a minimum while maintaining maximum flexibility to the secure application (effectively unlimited NVRAM). Therefore, CSM is only required to maintain the 32 bit sequence numbers, one for each application supported, using internal non-volatile memory storage.

Each secure application provides the key material for protecting individual blocks of NVRAM data associated with a unique applications. The flexibility exists in this scheme to share secure NVRAM between applications provide the both know the storage key. The application NVRAM protection key is provided as part of the encrypted code base for the secure application (protected by the CSM using the KSA key). The number of applications supported is limited by the number of sequence numbers that can be supported in by the CSM internal NVRAM. A minimum of one sequence number should be supported by the CSM.

The sequence numbers are assigned to the application by the CSM using an authentication code that should be provided by the secure application. The secure application stores the authorization code encrypted external to the CSM. The CSM increments the sequence number for the application only when the authorization data is provided by the secure application. The secure application may relinquish owner ship of a sequence number by providing the proper authorization to the CSM. The authorization requirement ensures that applications one application cannot corrupt another application in the CSM.

An internal RAM 720 is used for both program instruction execution as well as program scratch space. The CSM includes a hardware protection mechanism that ensures the separation of execution and data space in the RAM. The value can only be set when the code is loaded into the CSM. Therefore, the signed value with the secure encrypted executable code is used to setup the separation of the instruction and data areas in the RAM.

An application key cache 724 stores the "active keys". These keys are referenced by the hardware accelerator block for use in a manner that they are never exposed to any part of the external system. The application acceleration blocks are effectively within the security boundary of the CSM since the key material used in these blocks are never exposed. The external applications simply reference the key cache locations in the application key cache instead of directly loading key material into the acceleration blocks.

The application key cache locations are write-only hardware locations. This ensures that one secure application cannot read another secure application key cache location. The key cache locations are allocated by the external service provided by the external system to a secure application for dynamic use depending on system requirements.

In one embodiment, the following keys are programmed into the CSM NVM memory and are persistent long term keys.

KDC-CS Device Confidentiality Secret Key (Private Key)
KDC-CP Device Confidentiality Public Key
KNV Device NVRAM Storage Key (Symmetric 3DES/HMAC-SHA1 Key)
RNVM Random Bits
lenRNVM Length of Random Bits
DAUTH Application Authorization Data
SC_xxx Secure Configuration (stored in NVM read by Hardware used prior to release of reset)
DC_xxx Device Configuration (stored in NVM read by processor core)

The following terms are defined for referencing keys or parameters that are used by the CSM with reference to FIGS. 8 to 13.

KSA Secure Application Key (symmetric 3DES/HMAC-SHA1 key)
KCA Certificate Authority Signature Key Pair
KHI Authorized Application Signature Key Pair
KHI-P Authorized Application Signature Public Key
g Diffie-Hellman Generator (base)
x Diffie-Hellman Private Key (exponent)
p Diffie-Hellman Modulus
gx Diffie-Hellman Client Public Key
gy Diffie-Hellman Server Public Key In one embodiment, the public key value (KDC-CP) can be read from the CSM at any time. The public key can be read using a command that is issued to the CSM which returns the public key value. The configuration information for the device is always returned with the public key data (authorization data, product configuration data, etc.). An optional input parameter to this command forces the CSM to provide a serial stream of the hashed value of the public key and parameters via GPIO[1:0]. The configuration data is included in this hash value.

Figure 8:
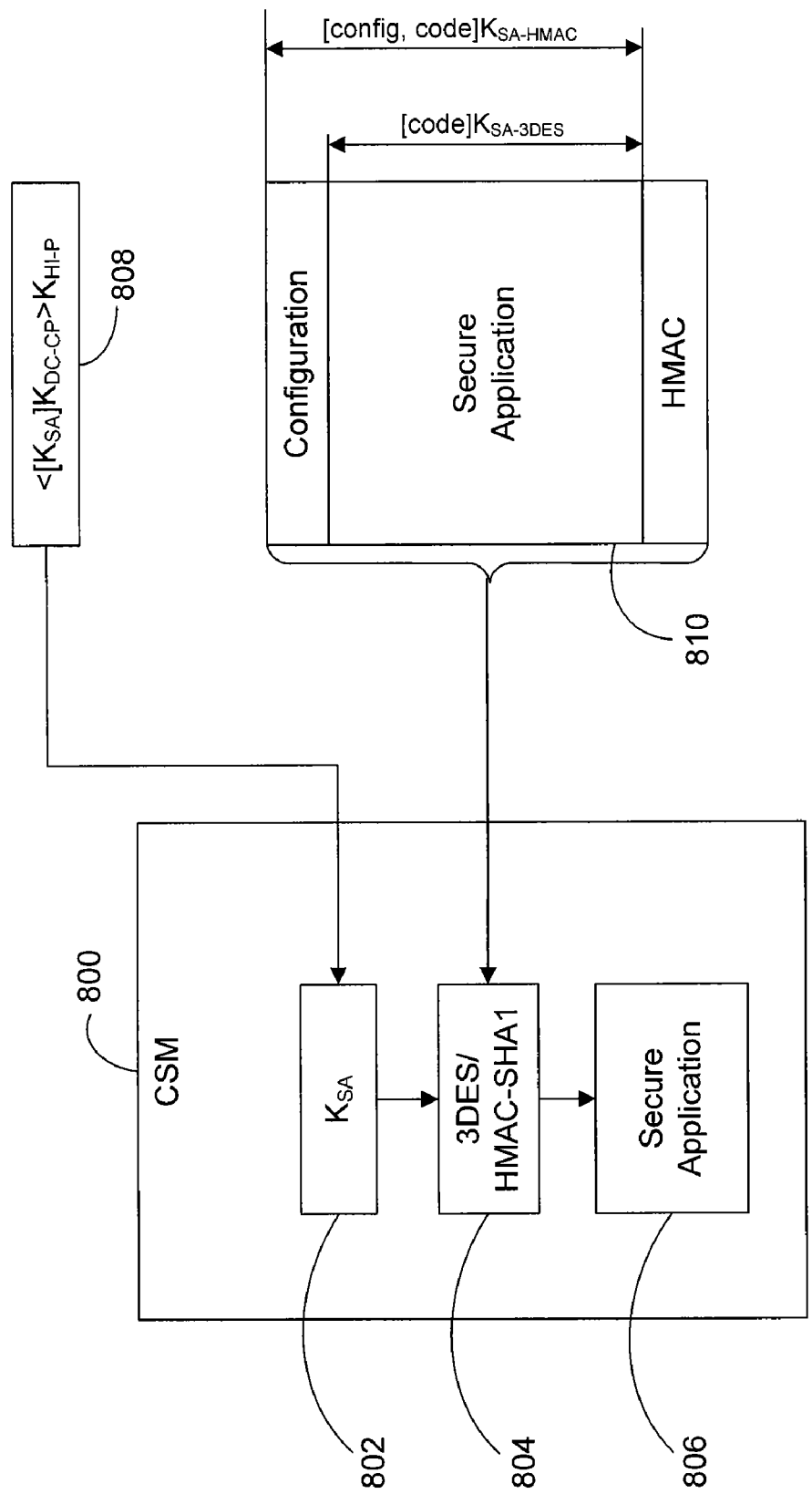
FIG. 8 depicts an exemplary process for loading a secure application code into a client security module, according to one embodiment of the present invention.

One of the main functions of the CSM is to provide a secure platform for the secure applications. An exemplary process for loading a secure application into CSM is shown in FIG. 8. A secure application key 808 is loaded first, then used by the CSM to decrypt and verify (in block 804) the secure application code 806. The secure application code 806 is loaded into the internal instruction memory of the CSM for execution. In one embodiment, the CSM uses the DLIES format for public key message operations. The CSM provides a hardware DLIES engine to load both the secure application key 802 (KSA) as well as loading the secure code (encrypted using KSA). An exemplary DLIES engine and a process for loading a secure code application is depicted in FIG. 9.

Figure 9:
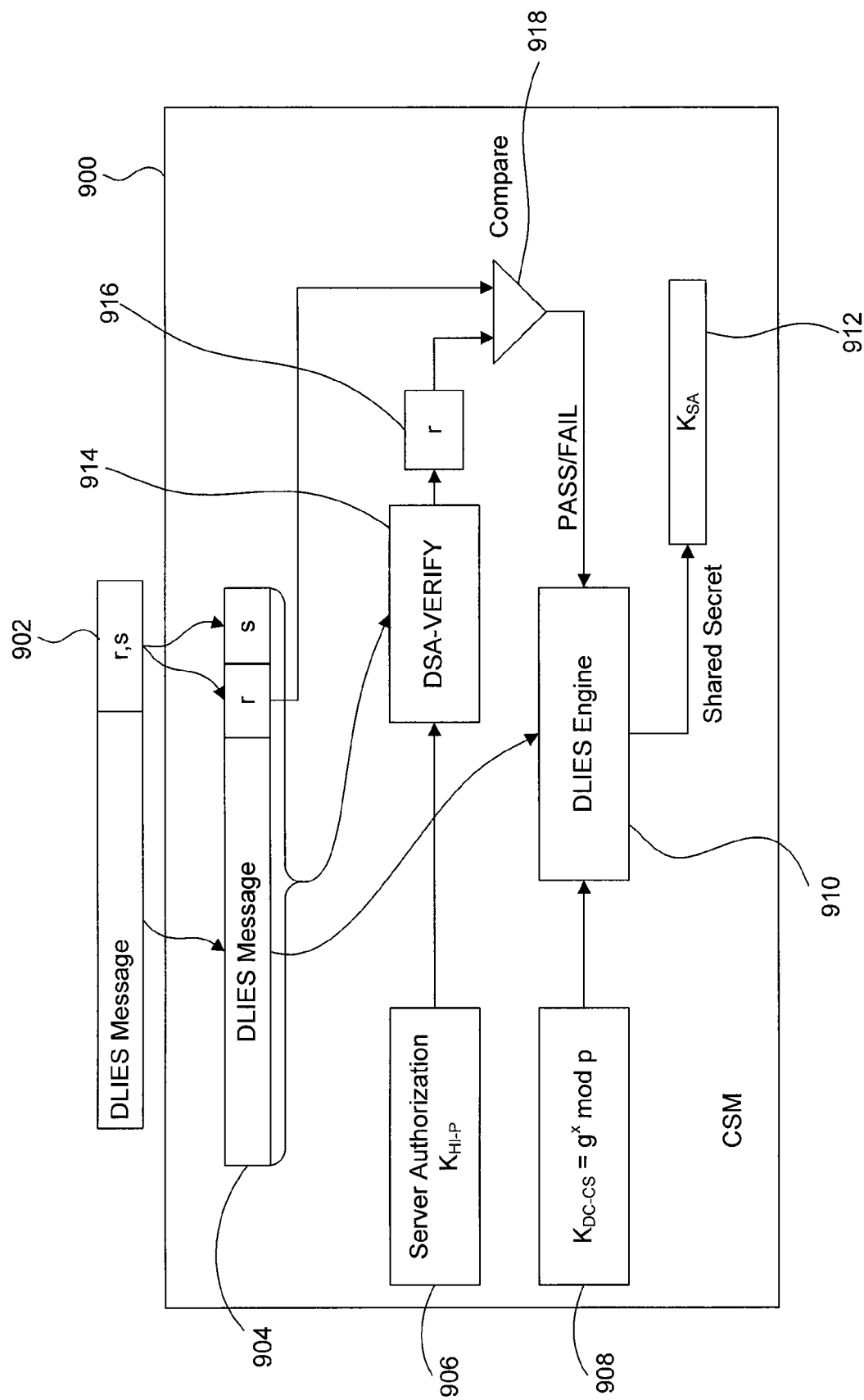
FIG. 9 illustrates an exemplary DLIES engine and a process for loading a secure code application into a client security module, according to one embodiment of the present invention.

As shown in FIG. 9, the secure application key (KSA) is provided as persistent data from a key provider to CSM 900. The data is provided as a DLIES message 902 that is signed by an authorized server. The signature is used to ensure that only authorized secure applications can be loaded into CSM 900. A server authorization key 906 is fed to a verification engine 914 along with the DLIES message 904 to generate an new r. The generated r is compared with r in the message 904 by compare logic 918 to output a pass/fail indication. The pass/fail indication along with the data part of the DLIES message and the key 908 are fed to the DLIES engine 910 to produce the shared secret 912.

The secure application can directly write the KSA register to initiate loading of another application. This capability allows the application designer to load applications without using the CSM key hierarchy. Therefore the base application key is the only key that needs to be uniquely encrypted using the CSM key. The secure application can use this mechanism to build a revocable key hierarchy.

Figure 10:
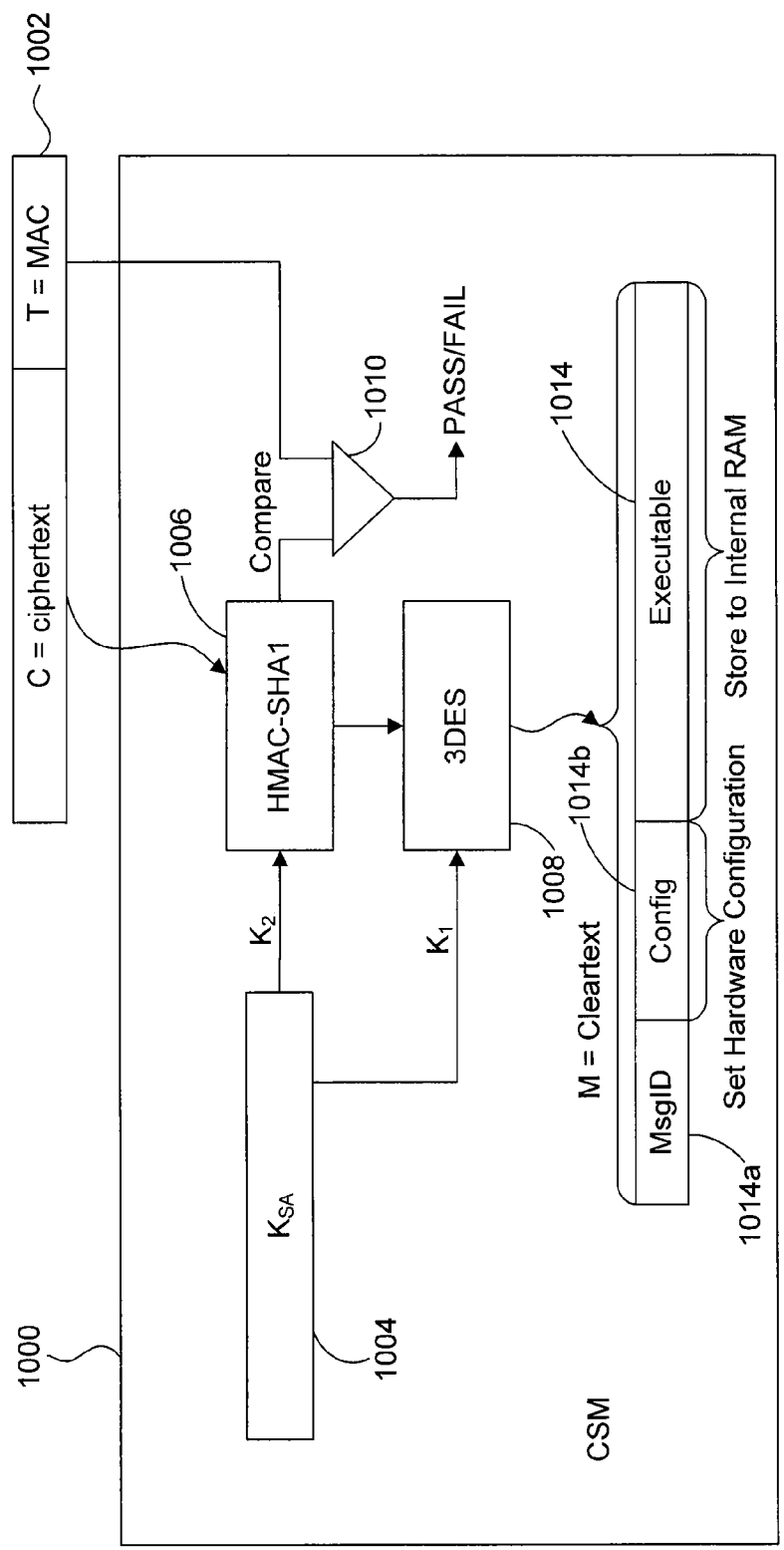
FIG. 10 shows an exemplary process for loading a secure application code into a client security module, according to one embodiment of the present invention.

Once the secure application key (KSA) has been loaded properly, the secure application code can be loaded using this key. An exemplary process for loading the secure application code is shown in FIG. 10. The ILES format for symmetric decryption is used with the hardware acceleration for 3DES and HMAC-SHA1 to decrypt and authenticate the entire data block. The data block contains a MsgID 1014a that indicates it is executable code. A configuration block 1014b is included for configuring the CSM hardware prior to execution of the secure code. The message 1002 includes a ciphertext portion and a T (MAC) portion. The ciphertext portion is input to the HMAC engine 1006 and the output is then compared to the MAC portion by compare logic 1010. The output of the HMAC engine 1006 is fed to a 3DES engine 1008 long with a key K1 output from the secure application key KSA 1004. The output of the 3DES engine 1008 produces the cleartext message to be executed.

The configuration block can be used to limit access to secure peripherals within the CSM 1000 to certain types of secure applications. The configuration block is also used to configure the instruction and scratch space within the CSM 1000. After the CSM configures the hardware and completes the authentication of the executable code. The CSM switches into execution mode. Once in execution mode, the hardware configuration cannot be changed by the secure application code.

The internal address structure of the CSM is remapped to execute from internal RAM. All other processor state, peripheral state, memory state, etc. is cleared when the transition to the executable secure application code. The process for loading new executable code can be initiated by the secure application code using whatever means programmed into the code. The hardware configuration of the CSM cannot be dynamically changed by the current executing program (only changed via the configuration data of the secure program loading process).

Figure 11:
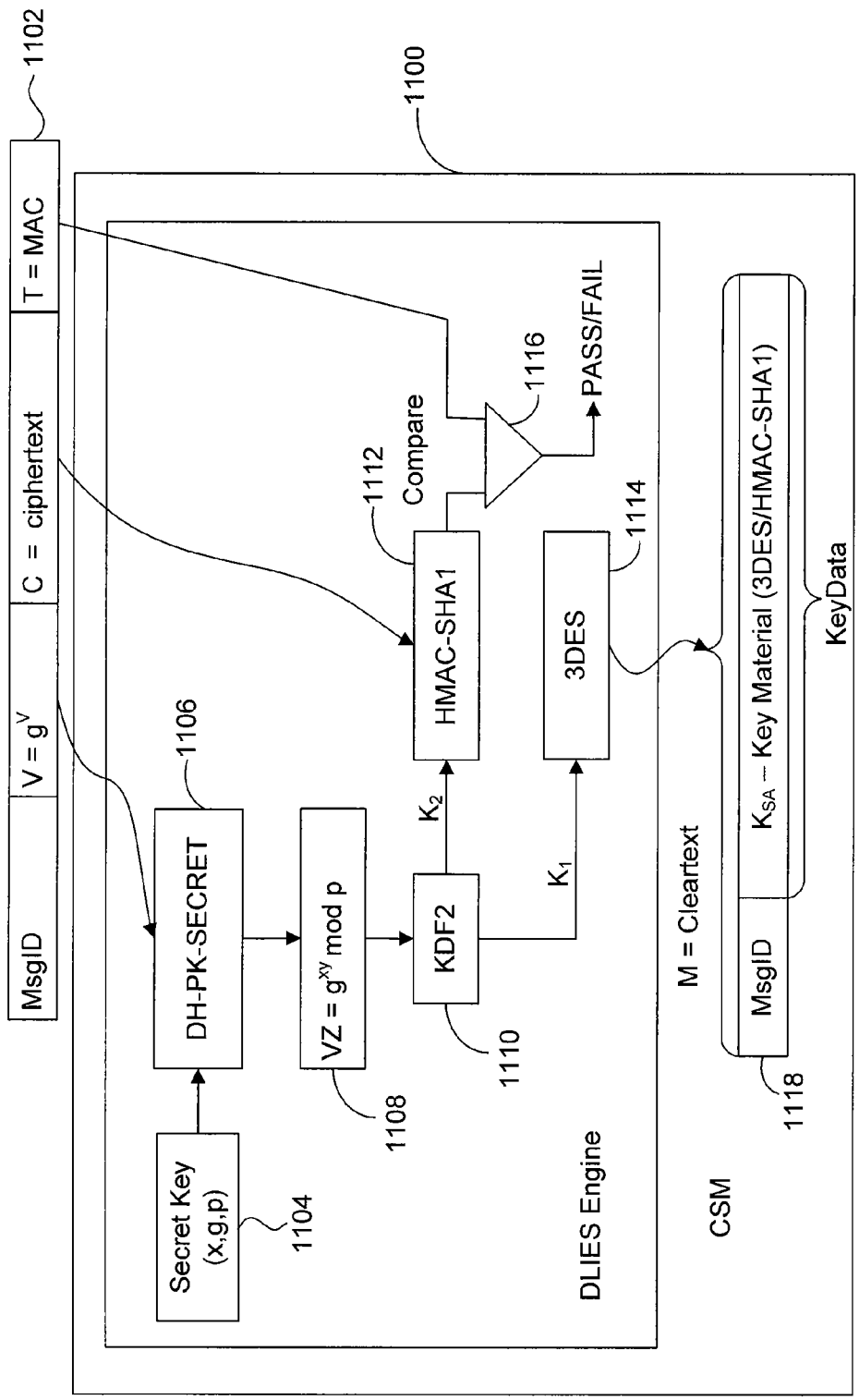
FIG. 11 illustrates an exemplary encryption process by a DLIES engine, according to one embodiment of the present invention.

FIG. 11 illustrates an exemplary encryption process by the DLIES engine 1100. As shown, the DLIES engine 1100 uses the public key (V) 1102b combined with the secret key (x,g,p) 1104 to generate the shared secret key (VZ) values 1108. Preferably, the algorithms used by the CSM are HMAC-SHA1 1112 as the message authentication code (MAC) algorithm and triple DES (3DES) 1114 as the confidentiality symmetric algorithm.

The shared secret key is used to verify the MAC and decrypt the message. The resulting clear text is stored internal to the CSM (never leaves the CSM). The decrypted message contains a message identifier 1116a that indicates whether this key is now cleartext. The message identifier indicates they algorithm(s) required to decrypt and authenticate the secure application code. In one embodiment, the 3DES/HMAC-SHA1 algorithms are used to process the secure code load thus, talking advantage of the DLIES hardware for further processing.

Figure 12:
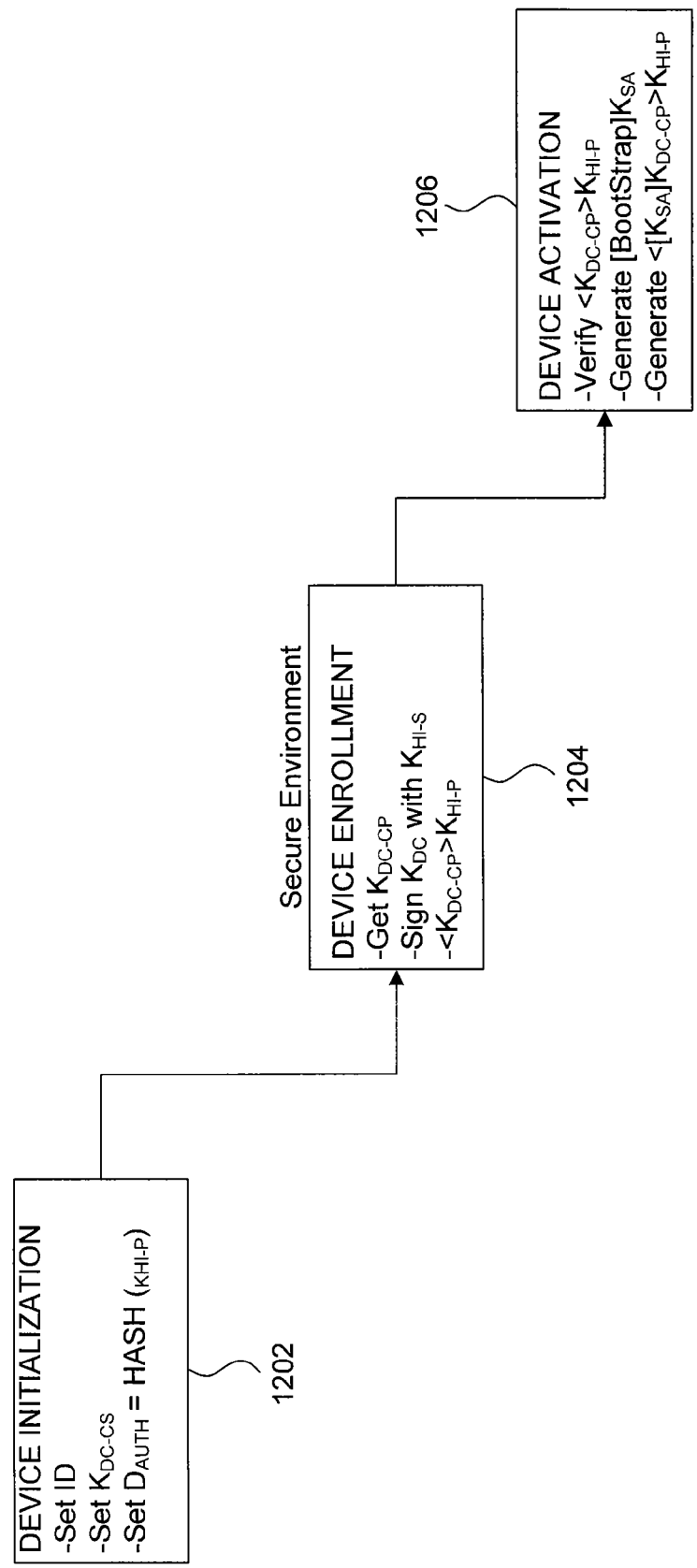
FIG. 12 illustrates exemplary basic steps in bringing a CSM into service, according to one embodiment of the present invention.

The flexible design of CSM allows for a number of flexible ways to bring a CSM into service. The utilization of third party services, no requirement for a battery, flexible cost structures for differentiated products (or level of service) are used to decrease the time to market and lower manufacturing costs of the overall system. FIG. 12 illustrates exemplary basic steps in bringing a CSM into service, according to one embodiment of the present invention.

As shown in block 1202, the device is first initialized. In this stage, the device private key (KDC-CS) is initialized internal to CSM. The private key ( ) is never known outside of the CSM. Preferably, the KDC-CS can never be accessed by any secure application code. The value is created as described below. The device key initialization process can occur either at time of device manufacture or during the system manufacture (device installation). Since the key material is always protected inside the security boundary of the CSM, either method can be used to initialize the key. However, the system manufacture may want to control the environment of the programming process at the same time as enrollment to ensure that a valid unprogrammed CSM was used in their system manufacturing process.

In one embodiment, the device key is stored in the NVROM embedded inside the CSM. The device key is stored in the NVROM as a collection of random bits that are used to generate the key material for the long term fixed keys in the CSM. The number of bits required is determined by the amount of key entropy required for the system. The CSM is capable of securely generating the required amount of key material from the random data stored in the NVROM. The random bits are denoted as RNVM of length len-RNVM.

The value of RNVM is generated using the internal random number generator value as the secret initialization seed. This data is used as KKEY of length 512 bits according to FIPS186-2 Standard for computing 'm' values of 'x' in this case, m=(lenRNVM/160)+1. This method generates 160 bits of data per operation and is repeated multiple times until the entire NVM array is filled with the random data stream.

The default key lengths used by the CSM are the following: KNV—160 b Secure Storage Key, and KDC-CS—256 b DH Confidentiality Secret Key (2048 bit modulus). The initialization of the random value is done internal to the CSM in such a manner where the random data is not exposed outside the security boundary. The application authorization data (DAUTH) 160 bits is programmed into the CSM during the key initialization. The authorization data is used to authenticate the root key server identity.

The device enrollment process, shown in block 1204 should be conducted in a physically secure monitored environment to ensure that only valid CSM devices are enrolled into the system. The CSM provides direct physical access (via GPIO pins) for extraction of a SHA-1 hash digest of the public key value. The enrollment process can also be done at the device (or chip) level by a certified third party. Since the digital device that contains the CSM only requires NVROM, the CSM can be enrolled at the device level prior to installation into a system.

The time to market advantage in having a ready supply of enrolled devices available for system manufacture can be exploited in this model. Additionally, the secure environment can be limited to the certified third party and does not need to be implemented in the system manufacturing environment.

Figure 13:
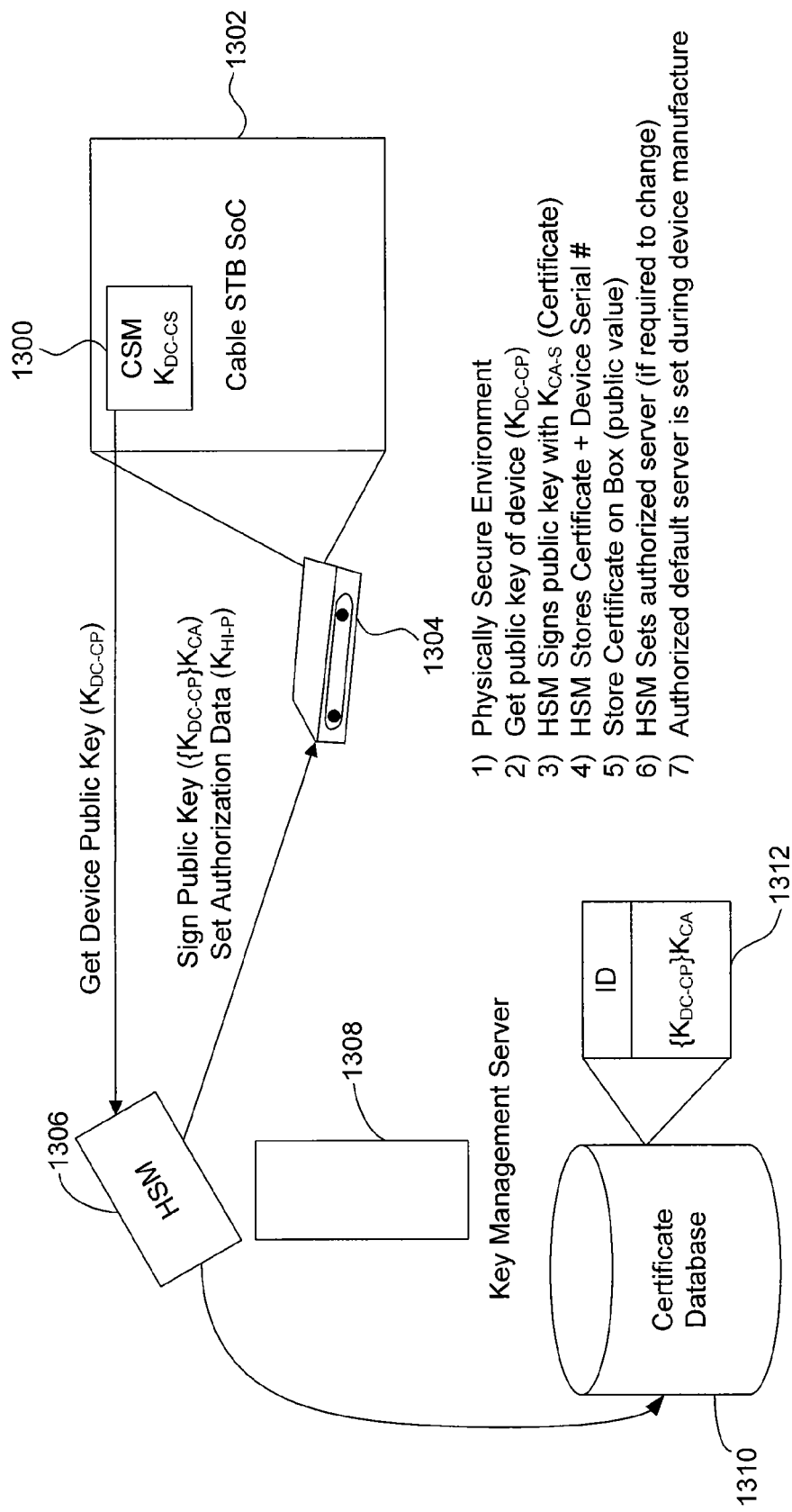
FIG. 13 shows an exemplary enrollment process for a cable STB device that uses a client security module, according to one embodiment of the present invention.

An exemplary enrollment process for a cable STB device 1302 that uses a CSM 1300 is shown in FIG. 13. The enrollment occurs in a secure environment to ensure that only valid public keys are signed by the enrollment station (HSM) (or Certificate Authority) 1306. The public key value (KDC-CP) is extracted from the CSM using the system interface provided. A direct probe of the GPIO pins is used to capture the SHA-1 hash digest of the extracted public key. The enrollment station (HSM) 1306 provides a secure environment for the signature key (KCA). The HSM verifies the SHA-1 digest utilizing the Certificate Database 1310 and signs the public key of the CSM, creating a certificate 1312 that binds the serial number of the system with the public key of the system.

The certificate 1312 need not be kept in a secure data base since it only contains public values and can be verified by anyone. The HSM 1306 may also chose to provide updated values for authorized activation servers 1308 (servers that can distribute keys to unlock secure application code). The default authorized activation server is provided during device initialization, as described above.

Referring back to FIG. 12, in device activation cycle 1206, the CSM is activated when an authorized secure application key is available to the CSM. The device can be activated at any number of points in the manufacturing or distribution process, since it does not require a secure environment. The activation of the CSM may be done without activating the system.

In the cable STB example of FIG. 13, the most likely scenario is to activate the CSM during system manufacture with a unique secure application that can then be used to boot strap the activation of the system. The CSM boot strap can be used to provide any type of system activation mechanism. Typically, device activation would include generating a unique CSM boot strap routine that includes key pairs for identification and confidentiality that are unique to the manufactured system. These keys can be used to load sub-sequent secure applications that can be distributed using the same encrypted code base (only the key to unlock the code needs to be distributed as a unique value. However, the flexibility of the CSM allows this mechanism to be determined by the security system designer.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A dynamically programmable security device comprising:
   a secure memory configured to securely store a unique device cipher key;
   a secure interface configured to:
      receive a first message from a server including first application code and associated first configuration information to initiate dynamic configuration of hardware of the security device for a first application,
      dynamically load the first application code into an instruction memory of the security device, wherein the first application code is authenticated prior to being dynamically loaded,
      receive a second message from the server including second application code and associated second configuration information to initiate dynamic configuration of the hardware of the security device for a second application, and
      dynamically load the second application code into the instruction memory of the security device, wherein the second application code is authenticated prior to being dynamically loaded; and
   a processor configured to:
      securely execute the first application code in an execution mode, wherein a hardware configuration of the security device cannot be changed by the first application code, and
      securely execute the second application code in the execution mode, wherein the hardware configuration of the security device cannot be changed by the second application code.

2. The security device of claim 1 further comprising an application key cache for storing active cryptographic keys in write-only locations, wherein the cryptographic keys of one application cannot be read by another application.

3. The security device of claim 1, wherein a RAM of the security device includes a hardware protection circuit for separating received application code and received application data.

4. The security device of claim 1, further comprising an address decoder for re-mapping a base address to a secure random access memory (RAM) after the first application code or the second application code is loaded in the RAM.

5. The security device of claim 1, further comprising a cryptographic engine for decrypting and authenticating the first application code and the second application code, wherein the cryptographic engine includes a DES/3DES acceleration block, a SHA-1 acceleration block, and a random number generator.

6. The security device of claim 1 further comprising a key generator for generating public keys from the securely stored cipher key.

7. The security device of claim 1 wherein the loaded first application code or the loaded second application code performs services of a trusted platform module.

8. The security device of claim 1 wherein the loaded first application code or the loaded second application code performs credit card transaction services for a mobile phone.

9. The security device of claim 1 wherein the loaded first application code or the loaded second application code performs security functions of a set-top box.

10. The client security device of claim 1, wherein the RAM includes a hardware protection circuit for separating application code and application data for the first application code and the second application code.

11. The security device of claim 1, wherein the instruction memory is configured prior to execution of the first or second application code.

12. The security device of claim 1, wherein the configuration information initiates dynamic configuration of peripherals within the security device.

13. The security device of claim 1, wherein the first application code is configured to write to a key register of the security device to initiate loading of third application code.

14. The security device of claim 1, wherein the unique device cipher key is used to verify that received application code is from a trusted source.

15. A method for securely executing a dynamically loaded application code in a security module, the method comprising:
   receiving a first message including first application code and associated first configuration information to initiate dynamic configuration of hardware of the security device for a first application;
   authenticating the first application code using at least one stored cipher key;
   dynamically loading the first authenticated application code in the security module;
   switching the security module to an execution mode wherein the hardware configuration of the security module cannot be changed by the first application code;
   securely executing the first application code;
   receiving a second message including second application code and associated second configuration information to initiate dynamic configuration of the hardware of the security device for a second application;
   authenticating the second application code;
   dynamically loading the second authenticated application code in the security module;

switching the security module to the execution mode wherein the hardware configuration of the security module cannot be changed by the second application code; and securely executing the second application code.

16. The method of claim 15, wherein the loading the first or second authenticated application code comprises:

loading a secure application key; and loading the first or second application code using the loaded key.

17. The method of claim 15, further comprising generating public keys from the at least one stored cipher key.

18. The method of claim 15, further comprising storing active cryptographic keys for executing applications and preventing reading the cryptographic keys of one application by another application.

19. The method of claim 15, wherein the securely executing the first or second application code comprises performing services of a trusted platform module.

20. The method of claim 15, wherein the securely executing the first or second application code comprises performing credit card transaction services for a mobile phone.

21. The method of claim 15, wherein the securely executing the first or second application code comprises performing security functions of a set-top box.

22. The method of claim 15, further comprising:

authenticating third application code; and dynamically loading the third authenticated application code in the security module.

23. A client security device capable of performing different dynamically loaded security functions, comprising:

a secure memory for storing a device key;

a cryptographic engine for authenticating first application code for a first security function and second application code for a second security function using the device key, wherein:

the first application code is sent in a first message from the server to the client security device, and the second application code is sent in a second message from the server to the client security device, the first message further includes first configuration information to initiate dynamic configuration of hardware of the security device for the first security function, and the second message further includes second configuration information to initiate dynamic configuration of hardware of the security device for the second security function; a secure interface for dynamically loading the authenticated first application code and second application code in a secure random access memory (RAM) in the client security device; and a processor for executing the authenticated first application code within a first security boundary and executing the authenticated second application code within a second security boundary, wherein the secure interface dynamically loads the authenticated second application code while the first application code is being executed by the processor.

24. The client security device of claim 23, further comprising an application key cache for storing active cryptographic keys for the first application code and the second application code in write-only locations, wherein the cryptographic keys of the first application code cannot be read by the second application code.

* * * * *